(12) United States Patent
Lee

(10) Patent No.: US 8,226,128 B2
(45) Date of Patent: Jul. 24, 2012

(54) RELEASABLE NUT-FREE C-CLIP SECURED PIPE FITTING

(76) Inventor: Ming-Yi Lee, Taipei (TW)

( * ) Notice: Subject to any disclaimer, the term of this patent is extended or adjusted under 35 U.S.C. 154(b) by 38 days.

(21) Appl. No.: 12/854,186

(22) Filed: Aug. 11, 2010

(65) Prior Publication Data

US 2012/0038149 A1 Feb. 16, 2012

(51) Int. Cl.
*F16L 37/00* (2006.01)

(52) U.S. Cl. ........................................ 285/305; 285/321

(58) Field of Classification Search .................. 285/307, 285/321, 305, 308, 390
See application file for complete search history.

(56) References Cited

U.S. PATENT DOCUMENTS

| | | | | |
|---|---|---|---|---|
| 2,701,147 A | * | 2/1955 | Summerville ..................... | 285/1 |
| 2,901,269 A | * | 8/1959 | Rickard ........................... | 285/39 |
| 3,129,777 A | * | 4/1964 | Haspert .......................... | 175/340 |
| 3,731,955 A | * | 5/1973 | Borsum et al. ................. | 285/111 |
| 3,773,360 A | * | 11/1973 | Timbers ......................... | 285/307 |
| 3,871,691 A | * | 3/1975 | Takagi et al. ................... | 285/321 |
| 3,887,222 A | * | 6/1975 | Hammond ...................... | 285/307 |
| 4,111,464 A | * | 9/1978 | Asano et al. ................... | 285/111 |
| 4,278,276 A | * | 7/1981 | Ekman ........................... | 285/49 |
| 4,281,601 A | * | 8/1981 | Overman ....................... | 102/276 |
| 4,471,978 A | * | 9/1984 | Kramer ......................... | 285/321 |
| 5,226,682 A | * | 7/1993 | Marrison et al. ............... | 285/308 |
| 5,607,190 A | * | 3/1997 | Exandier et al. ............... | 285/93 |
| 5,681,060 A | * | 10/1997 | Berg et al. ..................... | 285/305 |
| 6,019,399 A | * | 2/2000 | Sweeney ........................ | 285/248 |
| 6,533,327 B1 | * | 3/2003 | Twardawski et al. .......... | 285/110 |
| 7,264,281 B2 | * | 9/2007 | Le Quere ...................... | 285/308 |
| 7,273,237 B1 | * | 9/2007 | Plattner ......................... | 285/321 |
| 7,338,094 B2 | * | 3/2008 | Hoffmann ..................... | 285/321 |
| 7,364,207 B2 | * | 4/2008 | McGee et al. ................. | 285/321 |
| 7,445,250 B2 | * | 11/2008 | Swift et al. .................... | 285/321 |
| 7,478,841 B2 | * | 1/2009 | Meier et al. ................... | 285/321 |
| 7,631,905 B2 | * | 12/2009 | McGee et al. ................. | 285/321 |
| 7,819,438 B2 | * | 10/2010 | Swift et al. .................... | 285/321 |
| 7,841,629 B2 | * | 11/2010 | Hoffmann ..................... | 285/321 |
| 2003/0116965 A1 | * | 6/2003 | Hsu .............................. | 285/321 |
| 2004/0195834 A1 | * | 10/2004 | Steingass et al. ............. | 285/321 |
| 2005/0001426 A1 | * | 1/2005 | Dick et al. .................... | 285/321 |
| 2005/0046185 A1 | * | 3/2005 | Olson ........................... | 285/321 |
| 2005/0167976 A1 | * | 8/2005 | Le Quere et al. ............. | 285/39 |
| 2005/0285394 A1 | * | 12/2005 | Muto ............................ | 285/307 |
| 2007/0001450 A1 | * | 1/2007 | Swift et al. .................... | 285/306 |
| 2007/0176421 A1 | * | 8/2007 | Meier et al. ................... | 285/321 |
| 2009/0108580 A1 | * | 4/2009 | Hoffman ....................... | 285/277 |

* cited by examiner

*Primary Examiner* — Aaron Dunwoody

(74) *Attorney, Agent, or Firm* — Leong C. Lei

(57) ABSTRACT

A releasable nut-free C-clip secured pipe fitting includes a pipe to be jointed, a C-clip, a sealing ring, and a pipe fitting. The pipe has a jointed end forming a circumferential groove for receiving the C-clip. The C-clip is a ring like member having an opening, which allows for expansion and contraction of the C-clip so as to allow the C-clip to be disposed in a converging surface formed on an inside wall of the pipe fitting. The sealing ring is received in a sealing ring groove defined in the inside wall of the pipe fitting. The pipe fitting has a tube end forming a holding bore having an inside diameter smaller than a diameter of the converging surface. The tube end of the pipe fitting forms openings through which a tool can extend into the pipe fitting to contract the C-clip for releasing the C-clip and the pipe.

5 Claims, 6 Drawing Sheets

RELEASABLE NUT-FREE C-CLIP SECURED PIPE FITTING

TECHNICAL FIELD OF THE INVENTION

The present invention generally relates to a releasable nut-free C-clip secured pipe fitting, and particularly to a pipe fitting that is easy to mount, fast to release, efficient, and capable of substantially reducing costs of pipe fitting but maintains the desired characteristics of coupling strength, compression resistance, vibration resistance, and thermal expansion and contraction. The efficacy provided by the present invention is realized through interaction among various components, especially the combination among a fitting member, a C-clip, and sealing rings, which leads to multiple effects, including combined effects of fitting and sealing. Thus, besides effectively improving coupling strength and compression strength between pipes, the present invention also provides the functions of vibration resistance and enhanced leakage resistance.

Further, in the technical field to which the present invention belongs, the present invention provides a novel nut-free C-clip inlaid pipe fitting structure, of which the purpose is to save the effort and time required for tightening nuts and to reduce parts used in pipe fitting and lower the required skills in pipe fitting. Further, for a pipe to be jointed, the jointing is changed from the conventional "rigid" screwing joint to a "flexible" inlaying joint, which imposes new definition for pipe fitting and provides a novel result of jointing, ensuring desired resistance against high pressures, vibration, and thermal expansion caused by difference of temperature.

Further, through holes defined in a circumferential wall of an end of a pipe fitting are used to cooperate with two half-divided pipe releasing device, which comprises two halves that when combined with each other to clamp around the end of the pipe fitting allow release projections formed on inside surfaces of the two halves to extend through the through holes to contract a C-clip received in the pipe fitting for reducing an outside diameter of the C-clip for releasing the inlayed jointing. Thus, the present invention offers excellent result of use in respect of mounting and releasing.

DESCRIPTION OF THE PRIOR ART

Piping for conveying liquids is often composed of straight pipes and corner pipes, which are jointed through pipe fittings. A pipe fitting not only joints two pipes, but also provides a leakage-proof function. Thus, it is a major challenge for the state-of-the-art technology to provide efficacies of improved coupling strength, resistance against internal pressure, resistance against vibration, and resistance against thermal expansion at the expense of minimum costs.

In view of the above discussed, it is extremely difficult to meet the needs for the previously mentioned four concerns. For a conventional pipe fitting, it only works to maintain the jointing between pipes under a limited internal pressure, but the sealing effect is often lost within a limited period of time. Such an arrangement certainly causes concerns of safety and remedy for any problem caused by such an arrangement is often very expensive.

Conventionally, sealing is realized through fastening by nuts and arrangement of sealing rings. The conventional sealing ring is only capable of resistance against a limited pressure. Apparently, the conventionally used sealing rings and the tight fitting structure of the pipe itself are lacking of desired convenience and functionality. It is even worse that the lifespan is often shortened due to vibration caused by earthquakes, expansion and contraction caused by temperature difference, and instantaneous increases of internal pressure, which lead to fast fatigue and damage of the internal components. Thus, most of the piping engineering does not achieve the desired target of lifespan.

For better understanding of the structure and function of the conventional pipe fittings, reference is now made to FIG. 7 of the attached drawings, in which a pipe (A1) is jointed to a three-way joint (A2). The three-way joint (A2) comprises a top threading tube (A21) to which a threading cap (A3) is fastened. When the pipe (A1) is inserted into the threading tube (A21), a sealing ring (A4) is arranged therebetween to provide a sealing effect. Further, a metal washer (A5) is positioned atop the sealing ring (A4) and located outside the pipe (A1). With the metal washer (A5) being depressed by the tightening of the threading cap (A3), the sealing ring (A4) located below the metal washer (A5) is compressed and undergoes deformation to thereby secure the pipe (A1).

From the above description of the conventional pipe fitting, it is easily understood that in the complete combination of the joint, the metal washer (A5) and the sealing ring (A4) play a triple role of tightening, securing, and sealing. However, stretching tests of the pipe joint indicate that the coupling strength between the pipes is weak and in sufficient. This is due to the fact that securing and sealing are both realized through the sealing ring (A4), so that when the sealing ring (A4) is of permanent deformation or lacks of tightness, or if the sealing ring (A4) is twisted during the mounting process, all these lead to damage or malfunctioning of the sealing ring (A4). It is particularly noted that at the sealing joint, when a stretching force is applied, the pipe (A1) is either pulled off the joint or is caused to make a substantial shift. This situation is detrimental to piping systems, for it often leads to leaking and pipe breaking. Apparently, the conventional techniques do not seriously consider the basic requirements of a pipe fitting.

SUMMARY OF THE INVENTION

In view of the previously discussed problems, the present invention aims to provide a releasable nut-free C-clip secured pipe fitting, which based on the requirements for fast mounting and releasing and also for saving the components and costs of fastener nuts, uses a C-clip for securing purposes so as to improve the inlayed coupling strength and still maintain the jointing and leakage proof functions. Further, the present invention also provides multiple effects of resistance against high pressure, resistance against vibration, and resistance against temperature variation.

The present invention uses a C-clip inlaid and positioned in a circumferential groove formed in a pipe to be jointed. In the process of assembling, one or more sealing rings arranged below the C-clip function to secure leakage and provide the desired effect of sealing (also functioning to securing the pipe). Especially, when the C-clip is inlaid and fixed on the pipe to be jointed, it assists the sealing rings against influence caused by vibration and stretching force that leads to undesired displacement thereby ensuring the desired coupling strength of the sealing ring. Consequently, the present invention can provide efficacies for the four major concerns, including resistance against stretching force, resistance against internal pressure, resistance against vibration, and resistance against thermal expansion.

Structurally, the present invention comprises a pipe to be jointed, a C-clip, one or more sealing ring, and a pipe fitting, wherein the pipe has a pipe end that is processed to form an external circumferential groove for receiving the C-clip to inlay therein. The C-clip is a ring having an opening, which provides a clearance for expansion and contraction. The present invention employs such a feature in such a way that with the C-clip received in the groove of the pipe, a converging surface formed in an inside wall of the pipe fitting forces the C-clip to contact to tightly fit over the pipe so as to prevent the pipe from being pulled off. As such, the pipe is securely confined in the pipe fitting and the pipe is capable of standing minor vibration without being separated from the pipe fitting. Thus, the characteristics of the pipe for resisting vibration and improving coupling strength between pipes are both improved.

The characteristics of expansion and contraction realized through the clearance provided by the opening of the C-clip allows the C-clip to release the pipe fit therein through employing a half-divided pipe releasing device that is composed of two halves that are combined with each other to clamp around the pipe fitting so as to allow projections formed on inside surfaces of the two halves to extend through openings formed in a circumferential wall of the pipe fitting to contract the C-clip and thus reduce the outside diameter of the C-clip. This provides the present invention with excellent capability of mounting and releasing.

Further, the jointing and positioning between the pipe and the pipe fitting are realized through one or more sealing rings provided at the lower side to thereby provide the multi-layered effects of jointing and positioning. Such effects are to secure the jointing site (no displacement being allowed) and inward tightening an outer surface of the pipe to be jointed and outward tightening the pipe fitting to thereby realize multi-layered tightening and sealing. Thus, when the pipe jointed is subjected to adverse external factors, such as minor vibration and thermal expansions, tight engagement and sealing can be maintained between the pipe jointed and the sealing rings, which also provides excellent resistance against high pressure, resistance against vibration, and resistance against temperature difference.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
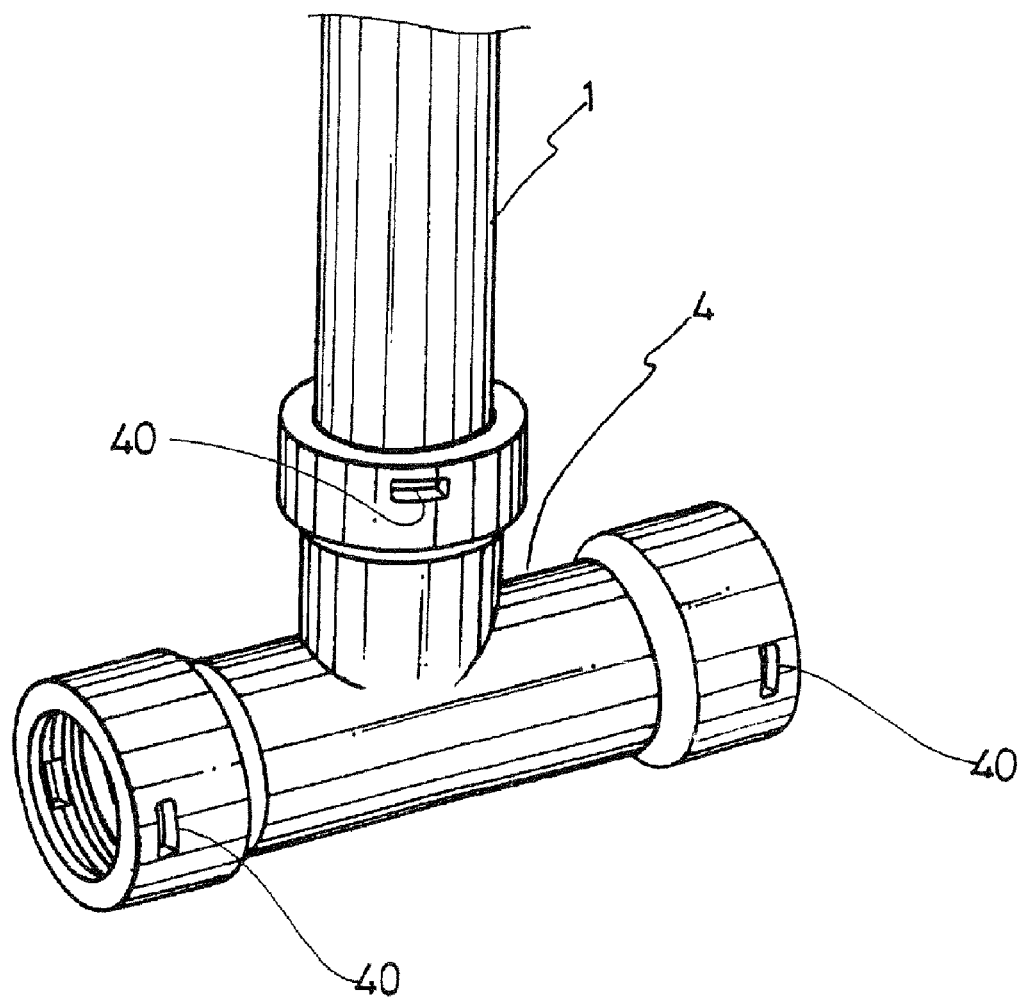
FIG. 1 is a perspective view of a preferred embodiment according to the present invention.
Figure 2:
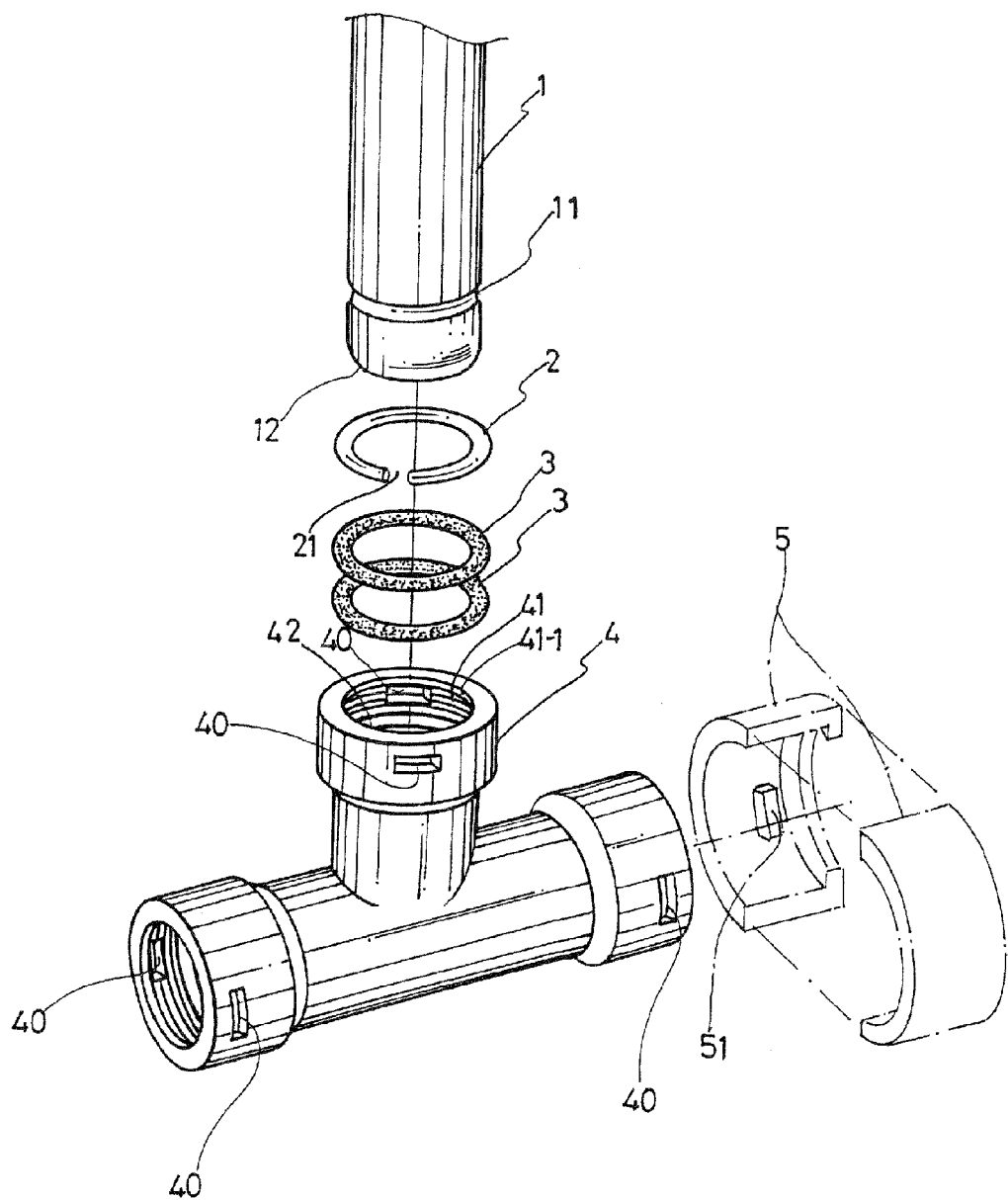
FIG. 2 is an exploded view of the present invention.

Referring to FIGS. 1 and 2, structurally, the present invention comprises a pipe (1) to be jointed, a C-clip (2), one or more sealing rings (3), and a pipe fitting (4). The pipe (1) has a jointed end, which is processed in advance to form a recessed circumferential groove (11) for receiving the C-clip (2) to inlay therein. The end of the pipe (1) has a circumferential edge that is made rounded (12) to allow for easy introduction and to prevent any damage of the one or more sealing rings (3) caused by a sharp edge of the pipe. Further, the C-clip (2) that is received in the circumferential groove (11) is a ring like member having an opening (21). The opening (21) provides a clearance that allows expansion and contraction of the C-clip (2). Thus, when the C-clip (2) together with the pipe (1) is fit into the pipe fitting (4), the C-clip (2) is first contracted for easy entry into the pipe fitting (4) and then expands to form a jointing condition with the pipe fitting (4).

As shown in FIG. 2, the pipe fitting (4) has a tube end having a circumferential wall in which symmetrical openings (40) are formed. The symmetrical openings (40) are for cooperation with a half-divided pipe releasing device (5), which is composed of two halves that when combined with each other to clamp around the tube end of the pipe fitting (4) allow projections (51) formed on inside surfaces thereof to extend through the openings (40) respectively in order to engage and forcibly contract the C-clip (2) received in the tube end of the pipe fitting (4) thereby reducing the outside diameter of the C-clip (2) for releasing. This allows the present invention to be repeatedly usable.

Through reducing the outside diameter of the C-clip to be smaller than an inside diameter of an end opening of the pipe fitting (4), the pipe fitting (4) can be released and separated. Further, for the requirement of repeatedly mounting and releasing, tools other than pipe releasing device (5) can also be used and no specific limitation is imposed, provided the tool can engage and contract the C-clip (2) through the symmetrical openings (40) for reducing the outside diameter of the C-clip (2) for releasing.

Figure 3:
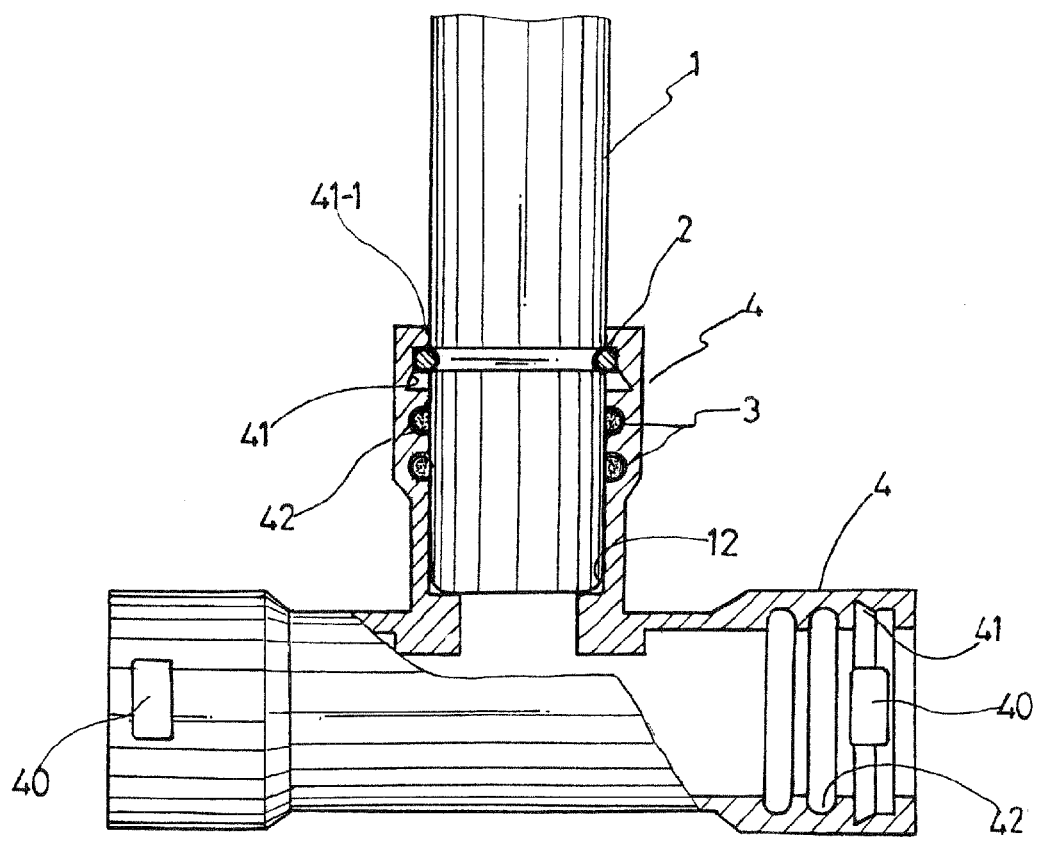
FIG. 3 is a cross-sectional of the present invention in an assembled form.
Figure 4:
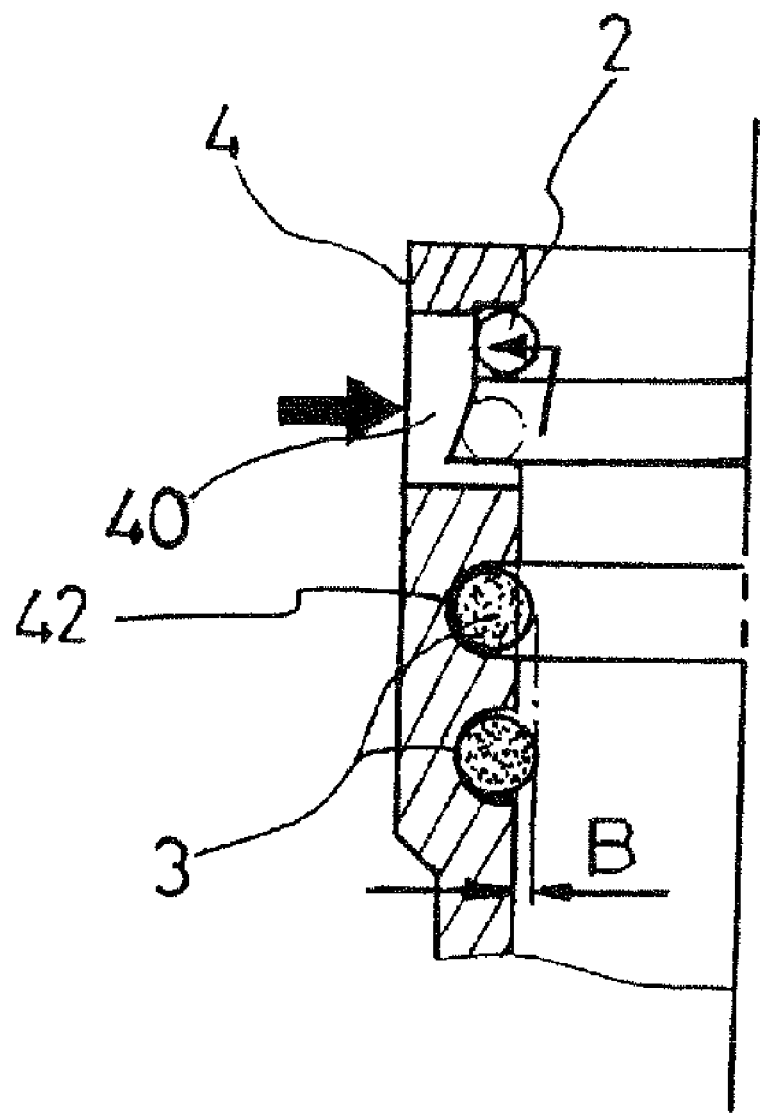
FIG. 4 is a cross-sectional view illustrating spatial relationship among a pipe to be jointed, a C-clip, and sealing rings according to the present invention.

As shown in FIGS. 3 and 4, the tube end of the pipe fitting (4) has an inside wall that forms a converging surface (41) that accommodates the C-clip (2) therein. The converging surface (41) is of a converging and clamping structure and the end opening of the pipe fitting forms a holding bore (41-1), which has an inside diameter smaller than an inside diameter of the converging surface (41). In other words, the converging surface (41) works on the C-clip (2) and the pipe (1) inserted into the pipe fitting (4) in such a way that through application of a force to pull the C-clip (2) into the converging surface (41), the C-clip (2) is forced to converge and tightly inlay in the circumferential groove (11) of the pipe (1) so that C-clip (2) is confined by the holding bore (41-1) of the tube end of the fitting without separation thereby realizing the effects of securing and clamping around the pipe (1).

Due to the combination among the pipe (1), the C-clip (2), and the pipe fitting (4), the pipe (1) can be securely positioned and thus the sealing rings (3) arranged below the pipe (1) are also securely positioned and are not displaced by any extension or stretching of the pipe (1) which may lead to distortion of the sealing rings (3) which in turn causes leaking and damage. Thus, when the sealing rings (3) are fit over the outside surface of the pipe (1), they can be properly positioned into sealing ring grooves (42) defined inside the pipe fitting (4) to realize air tightness and sealing against leakage.

In respect of the sealing rings (3), the best size arrangement is that the inside diameter of the sealing rings (3) be smaller than an outside diameter of the pipe (1) to be jointed. After being set on the pipe (1), the sealing rings (3) are of a minor compression clearance for clamping around the pipe (1). Thus, with the combination among the C-clip (2), the sealing rings (3), and the pipe fitting (4), when the pipe is subjected to adverse external factors, such as minor vibration, thermal expansion and contraction, stretching forces, and instantaneous increase of pressure, tight engagement can be maintained among the pipe (1), the C-clip (2), and the sealing rings (3) to ensure excellent strength against stretching or pulling and excellent capability of sealing and further providing excellent resistances against high pressure, vibration, and temperature variation.

Figures 5, 6:
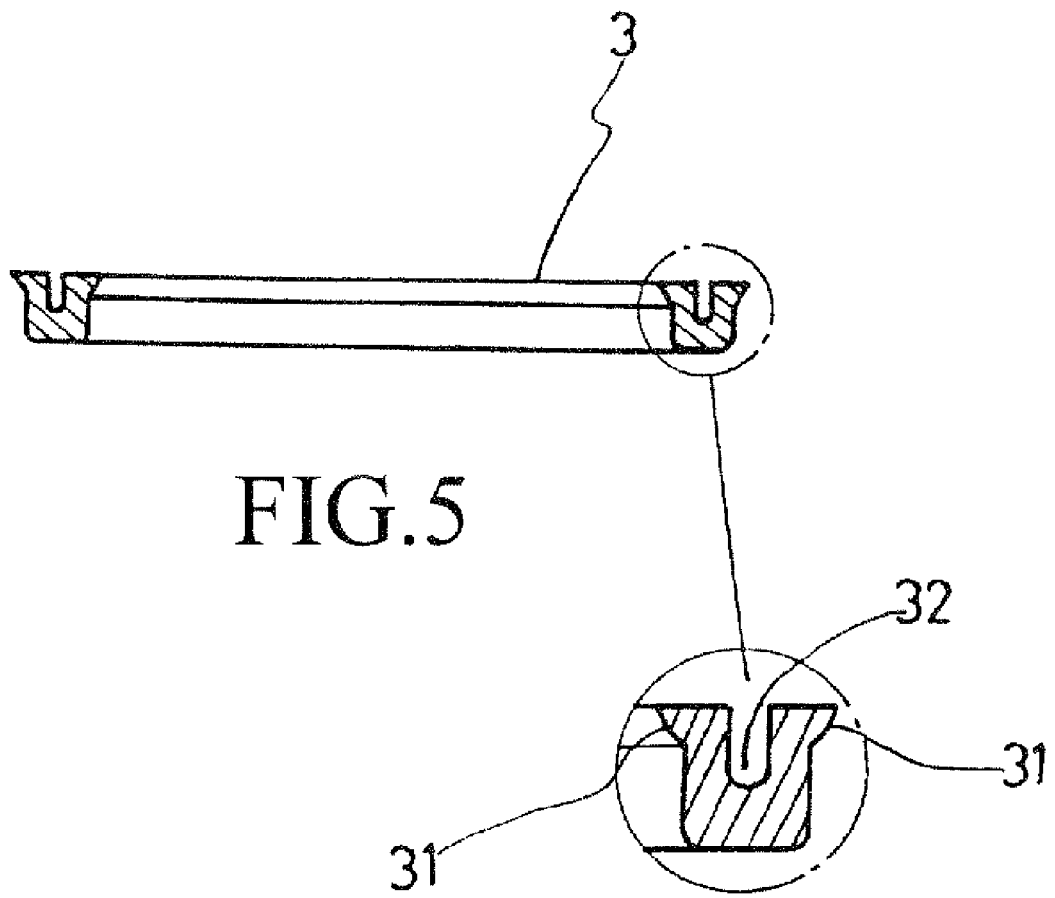
FIG. 5 is a cross-sectional view illustrating a sealing ring according to a different embodiment of the present invention.
FIG. 6 is an enlarged view of a circled portion of FIG. 5.
Figure 7:
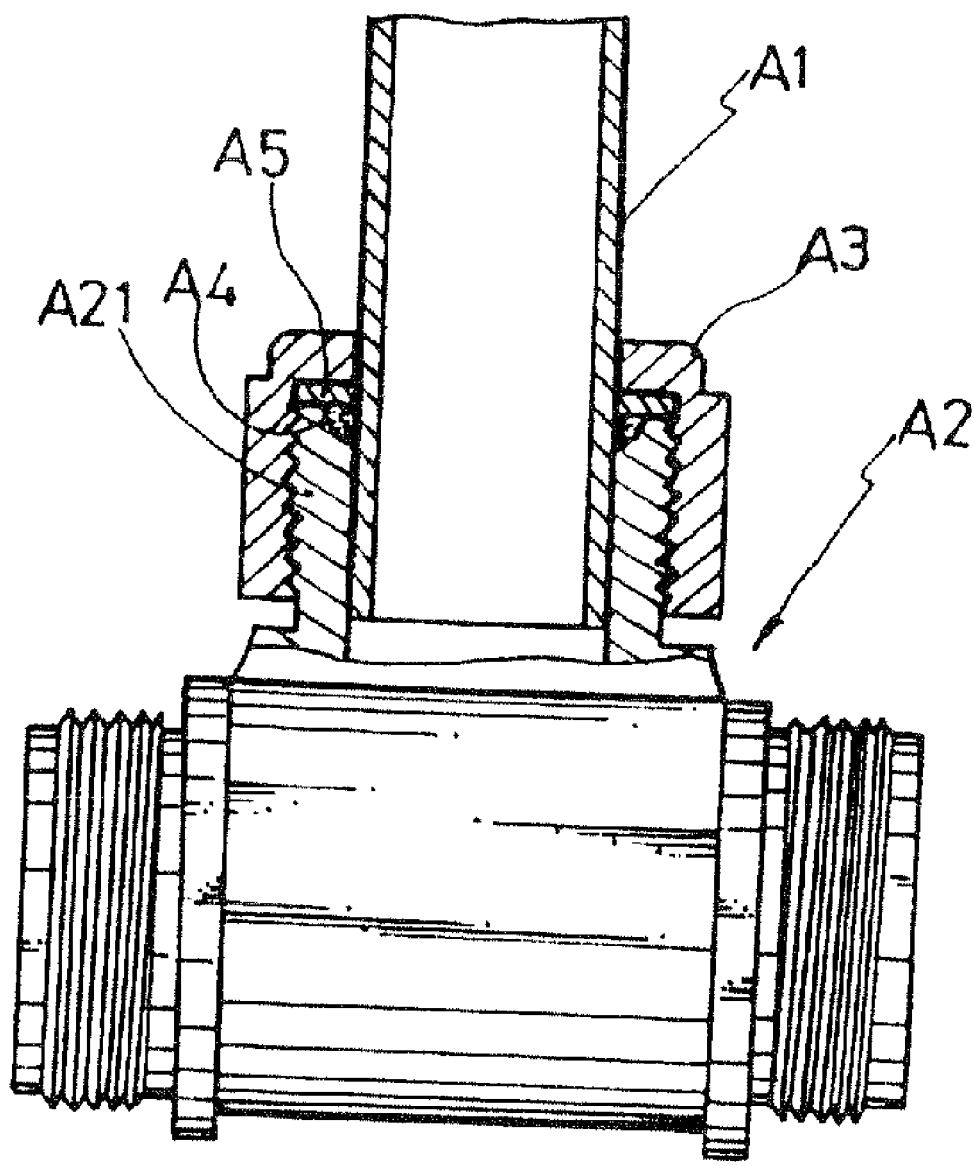
FIG. 7 is a cross-sectional view of a conventional pipe fitting in an assembled form.

With the same design principle of the present invention, the sealing rings (3) can be modified as a structure showing a channel for clearance, as shown in FIGS. 5 and 6. The modified sealing ring (3) has a cross-sectional shape having a top edge forming an inner abutting rim (31) for abutting the pipe (1) and an outer abutting rim (31) abutting the sealing ring groove (42) and also forming a central clearance channel (32) that serves as a clearance for expansion of the sealing ring (3) when the sealing ring (3) is acted upon by a great internal pressure, so as to provide a desired expansion and clamping effect.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pipe system comprising:
    a pipe fitting;
    a pipe receivable in the pipe fitting from a holding bore at an end of the pipe fitting;
    a C-clip received in a circumferential groove at an outside of a sidewall of the pipe, wherein the C-clip has an arc structure with two opposed finger ends separable from each other so as to be allowed for expansion and contraction, wherein the C-clip contacts an inner wall of a space in the pipe fitting, wherein the inner wall has a sloped surface and has a diameter greater than that of the holding bore, wherein multiple openings at a sidewall of the pipe fitting correspond in position to the C-clip such that the pipe is detachable from the pipe fitting by multiple projections passing through the openings and forcibly contracting the C-clip so as to reduce a diameter of the C-clip; and
    a sealing ring received in a groove at an inside of the sidewall of the pipe fitting, wherein the sealing ring is farther away from the holding bore than the C-clip.

2. The pipe system according to claim 1, wherein the sidewall of the pipe has a rounded edge received in the pipe fitting.

3. The pipe system according to claim 1, wherein the sealing ring has an inside diameter smaller than an outside diameter of the pipe before the sealing ring joining the pipe.

4. The pipe system according to claim 1, wherein the sealing ring has a U-shaped structure having two abutting rims at two opposed finger ends thereof, respectively, wherein the two abutting rims abuts the pipe and the groove at the inside of the sidewall of the pipe fitting, respectively, wherein a clearance channel is in the U-shaped structure.

5. The pipe system according to claim 1, wherein two openings at the sidewall of the pipe fitting are symmetric.

* * * * *